US008141133B2

(12) United States Patent
Pagan

(10) Patent No.: US 8,141,133 B2
(45) Date of Patent: Mar. 20, 2012

(54) FILTERING COMMUNICATIONS BETWEEN USERS OF A SHARED NETWORK

(75) Inventor: William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 11/733,854

(22) Filed: Apr. 11, 2007

(65) Prior Publication Data

US 2008/0256602 A1 Oct. 16, 2008

(51) Int. Cl.
*G06F 7/04* (2006.01)
*G06F 15/16* (2006.01)
*H04L 29/06* (2006.01)
(52) U.S. Cl. .................. 726/3; 726/2; 726/13; 713/182
(58) Field of Classification Search .................. None
See application file for complete search history.

(56) References Cited

U.S. PATENT DOCUMENTS

| 6,266,692 | B1 | | 7/2001 | Greenstein | |
|---|---|---|---|---|---|
| 7,222,157 | B1 | * | 5/2007 | Sutton et al. | 709/206 |
| 7,580,982 | B2 | * | 8/2009 | Owen et al. | 709/206 |
| 7,797,529 | B2 | * | 9/2010 | Jiang et al. | 713/151 |
| 2001/0044818 | A1 | * | 11/2001 | Liang | 709/201 |
| 2002/0120600 | A1 | * | 8/2002 | Schiavone et al. | 707/1 |
| 2003/0009495 | A1 | * | 1/2003 | Adjaoute | 707/501.1 |
| 2003/0101227 | A1 | * | 5/2003 | Fink | 709/207 |
| 2003/0105827 | A1 | * | 6/2003 | Tan et al. | 709/206 |
| 2003/0131063 | A1 | * | 7/2003 | Breck | 709/206 |
| 2003/0140014 | A1 | | 7/2003 | Fitzsimmons | |
| 2003/0229672 | A1 | | 12/2003 | Kohn | |
| 2004/0006621 | A1 | * | 1/2004 | Bellinson et al. | 709/225 |
| 2005/0015626 | A1 | * | 1/2005 | Chasin | 713/201 |
| 2005/0050222 | A1 | * | 3/2005 | Packer | 709/238 |
| 2005/0055416 | A1 | * | 3/2005 | Heikes et al. | 709/207 |
| 2005/0080864 | A1 | * | 4/2005 | Daniell | 709/206 |
| 2005/0102381 | A1 | * | 5/2005 | Jiang et al. | 709/220 |
| 2005/0132042 | A1 | * | 6/2005 | Cryer | 709/224 |
| 2005/0149606 | A1 | * | 7/2005 | Lyle et al. | 709/200 |
| 2005/0198031 | A1 | * | 9/2005 | Pezaris et al. | 707/9 |

(Continued)

FOREIGN PATENT DOCUMENTS

WO WO 2005/086437 A1 9/2005

OTHER PUBLICATIONS

K. Lerman, "Social Networks and Social Informaiton Filtering on Digg," Dec. 2006, University of Southern California Information Sciences Institute, pp. 1-8.*
P. Mika, "Flink: Semantic Web Technology for the Extraction and Analysis of Social Networks," May 2005, Journal of Web Semantics, pp. 1-13.*

(Continued)

*Primary Examiner* — Luu Pham
(74) *Attorney, Agent, or Firm* — H. Barrett Spraggins; Cynthia G. Seal; Biggers & Ohanian, LLP.

(57) ABSTRACT

Methods, systems, and products are provided for filtering communications between users of a shared network. Embodiments include receiving a communication from a sender for delivery to a recipient; retrieving a receipt policy for the recipient; retrieving a profile for the sender; determining whether the sender's profile complies with the receipt policy for the recipient; delivering the communication to the recipient if the sender's profile complies with the receipt policy for the recipient; and blocking the communication if the sender's profile does not comply with the receipt policy for the recipient.

27 Claims, 9 Drawing Sheets

U.S. PATENT DOCUMENTS

| | | | |
|---|---|---|---|
| 2005/0256764 A1* | 11/2005 | Beaumont et al. | 705/14 |
| 2005/0289131 A1* | 12/2005 | Aenlle et al. | 707/3 |
| 2006/0053293 A1* | 3/2006 | Zager et al. | 713/176 |
| 2006/0129644 A1* | 6/2006 | Owen et al. | 709/206 |
| 2006/0206713 A1* | 9/2006 | Hickman et al. | 713/176 |
| 2006/0248573 A1* | 11/2006 | Pannu et al. | 726/1 |
| 2006/0282304 A1* | 12/2006 | Bedard et al. | 705/10 |
| 2007/0150537 A1* | 6/2007 | Graham | 709/203 |
| 2007/0233736 A1* | 10/2007 | Xiong et al. | 707/104.1 |
| 2008/0065604 A1* | 3/2008 | Tiu et al. | 707/3 |
| 2008/0065701 A1* | 3/2008 | Lindstrom et al. | 707/201 |
| 2008/0104495 A1* | 5/2008 | Craig | 715/205 |
| 2008/0162642 A1* | 7/2008 | Bachiri et al. | 709/206 |
| 2008/0189380 A1* | 8/2008 | Bosworth et al. | 709/207 |
| 2008/0189768 A1* | 8/2008 | Callahan et al. | 726/4 |
| 2009/0112701 A1* | 4/2009 | Turpin et al. | 705/10 |

OTHER PUBLICATIONS

L. Vignollet et al., "Regulation Mechanisms in an Open Social Media Using a Contact Recommender System," 2005, University of Savoie, France, pp. 1-18.*

Malik, et al; An Electronic Mail Distribution System for Permitting the Sender of Electronic Mail to Control the Distribution of Sent Electronic Mail Messages; Dossier AUS920031081; Jun. 17, 2004.

Davis et al; Technique for Detecting and Blocking Unwanted Instant Messages; Dossier END920040086; Nov. 9, 2004.

Medvedev et al; Method and System for Identifying Spam Email; Dossier AUS920050483; Aug. 11, 2005.

Green; How URL Spam Filtering Beats Bayesian/Heuristics Hands Down; 2005; GreenView Data; Ann Arbor, Michigan.

* cited by examiner

Receipt Policy
410

User ID ~ 480
Acceptable Age Rage ~ 482
Picture Required ~ 484
Blocked Communications Threshold~ 486
URLs Restricted ~ 488
Common Contacts Required ~ 490
Common Friends Required ~ 492
Acceptable Geographic Locations ~ 494
Whitelist of Exempt Users ~ 496
Flash Restriction ~ 498
Restricted keywords ~ 499

FIG. 4

Sender Profile
414

User ID ~ 460
Age ~ 462
Picture ~ 464
Count of Blocked Communications ~ 466
URL ~ 468
Contacts List ~ 470
Friends List ~ 472
Geographic Location ~ 474
Status of Account ~ 476

FIG. 5

FILTERING COMMUNICATIONS BETWEEN USERS OF A SHARED NETWORK

BACKGROUND OF THE INVENTION

1. Field of the Invention

The field of the invention is data processing, or, more specifically, methods, apparatus, and products for filtering communications between users of a shared network.

2. Description of Related Art

Users of social networking websites or instant messenger networks are often spammed with communications such as friend requests and instant messages from users that are looking to promote unwelcome sales or other businesses. A user can be flooded with these spam communications and currently, each must be individually denied. Some social network websites allow a user to set your profile as private, requiring sender of communications to know some vital piece of information about the user before delivering the communicator. The drawback to this, however, is that many use social networking websites to keep in contact with people they have newly met or to meet new people. As such, a method is needed for preventing malicious users from spamming other users with unwelcome communications while allowing genuine users to keep their profiles open and public, ensuring that new people can find and contact them.

SUMMARY OF THE INVENTION

Methods, systems, and products are provided for filtering communications between users of a shared network. Embodiments include receiving a communication from a sender for delivery to a recipient; retrieving a receipt policy for the recipient; retrieving a profile for the sender; determining whether the sender's profile complies with the receipt policy for the recipient; delivering the communication to the recipient if the sender's profile complies with the receipt policy for the recipient; and blocking the communication if the sender's profile does not comply with the receipt policy for the recipient.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4 sets forth a block diagram of a data structure representing a receipt policy for user.

FIG. 5 sets forth a block diagram illustrating an exemplary data structure representing a sender's profile.

DETAILED DESCRIPTION OF EXEMPLARY EMBODIMENTS

Figure 1:
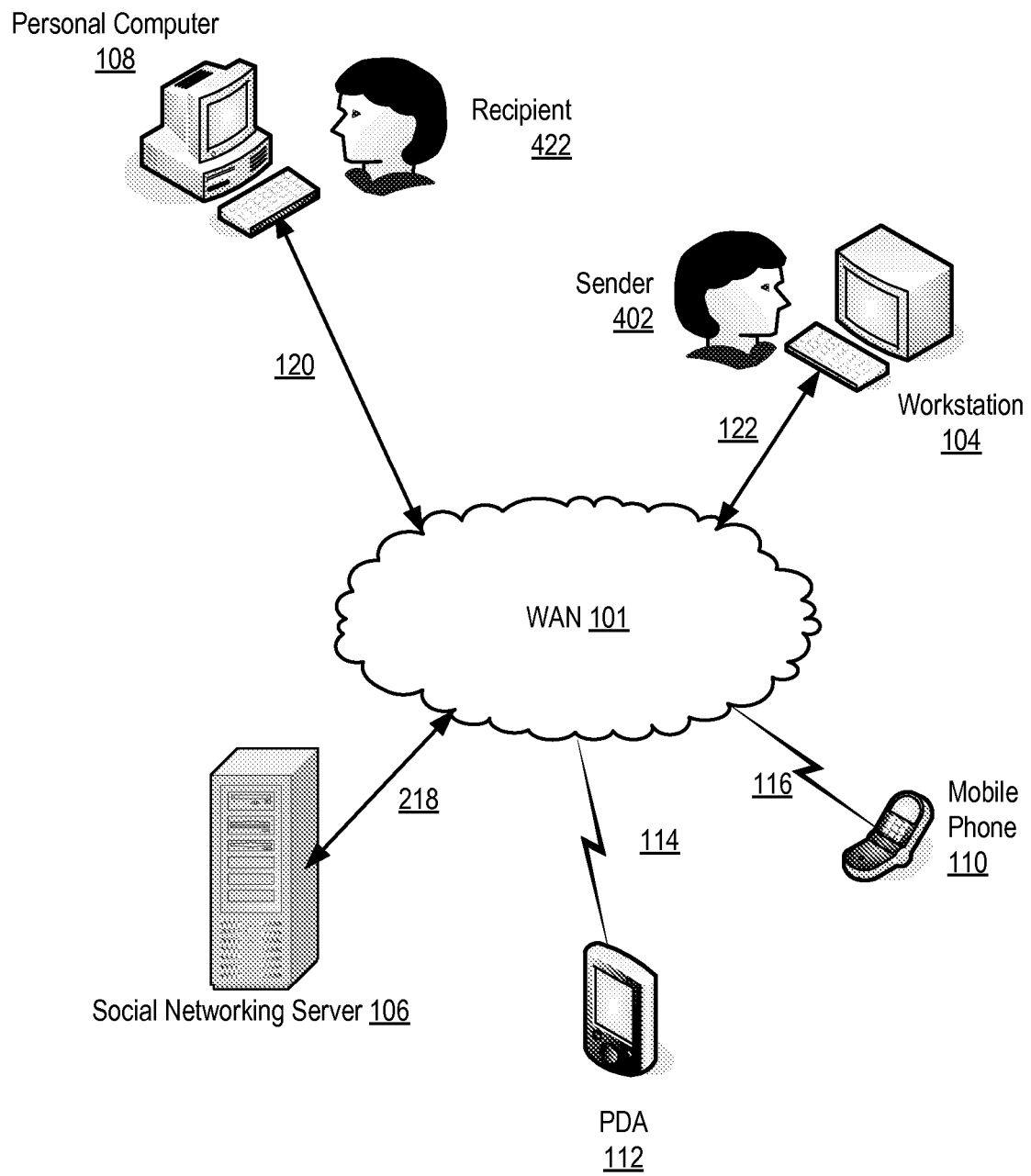
FIG. 1 sets forth a network diagram illustrating an exemplary system for filtering communications between users of a shared network according to embodiments of the present invention.

Exemplary methods, systems, and products for filtering communications between users of a shared network according to embodiments of the present invention are described with reference to the accompanying drawings, beginning with FIG. 1. FIG. 1 sets forth a network diagram illustrating an exemplary system for filtering communications between users of a shared network according to embodiments of the present invention. The system of FIG. 1 operates generally to filter communications between users of a shared network according to embodiments of the present invention by receiving a communication from a sender for delivery to a recipient; retrieving a receipt policy for the recipient; retrieving a profile for the sender; determining whether the sender's profile complies with the receipt policy for the recipient; delivering the communication to the recipient if the sender's profile complies with the receipt policy for the recipient; and blocking the communication if the sender's profile does not comply with the receipt policy for the recipient.

The term 'shared network' means a network whose communications are managed by a single provider and who maintains profile data on the users of those communications. One example of a shared network is a network supported by a social networking website such as MySpace.com. MySpace.com supports communications such as 'Friend Requests' which may be filtered according to embodiments of the present invention. Another example of a shared network in which communications maybe filtered according to embodiments of the present invention include instant messaging networks such as Yahoo Messenger, AOL Instant Messenger and others as will occur to those of skill in the art. Communications supported by such instant messaging networks which may be filtered according to embodiments of the present invention include invitations for inclusion in a contacts lists, instant messages, private messages in supported by social networking sites, public comments supported by social networking sites, and others as will occur to those of skill in the art.

In the system of FIG. 1, several exemplary devices including a PDA (112), a computer workstation (104), a mobile phone (110), personal computer (102), a laptop (126) may be used to access a shared network across a side area network ('WAN') (101) by logging into a social networking website hosted by the social networking server. The network-enabled mobile phone (110) connects to WAN (101) through wireless link (116) and the PDA (112) connects to network (101) through wireless link (114). In the example of FIG. 1, the personal computer (108) connects through a wireline connection (120) to WAN (101), the computer workstation (104)

connects through a wireline connection (122) to WAN (101), and the server (106) connects through a wireline connection (218) to WAN (101).

The social networking server (108) has installed upon it a communications filtering module that operates generally to filter communications between users (422 and 402) of a shared network according to embodiments of the present invention by receiving a communication, such as a friend request, from a sender (402) for delivery to a recipient (422); retrieving a receipt policy for the recipient (422); retrieving a profile for the sender (402); determining whether the sender's profile complies with the receipt policy for the recipient; delivering the communication to the recipient (422) if the sender's profile complies with the receipt policy for the recipient; and blocking the communication if the sender's profile does not comply with the receipt policy for the recipient.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Filtering communications between users of a shared network in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary network server (152) useful in filtering communications between users of a shared network according to embodiments of the present invention. The network server (152) of FIG. 2 includes at least one computer processor (156) or 'CPU' as well as random access memory (168) ('RAM') which is connected through a system bus (160) to processor (156) and to other components of the network server.

Stored in RAM (168) is a web server (232) and a shared network application (106). The shared network application (106) implements a network whose communications are managed by a single provider and who maintains profile data on the users of those communications. The shared network application is shown as a single application in the example of FIG. 2. This is for explanation and not for limitation. In fact, many shared networks may be implemented using many applications often supported by more than one server.

The shared network application (106) includes a communications filtering module (234), computer program instructions for filtering communications between users of a shared network by a communication from a sender for delivery to a recipient; retrieving a receipt policy for the recipient; retrieving a profile for the sender; determining whether the sender's profile complies with the receipt policy for the recipient; delivering the communication to the recipient if the sender's profile complies with the receipt policy for the recipient; and blocking the communication if the sender's profile does not comply with the receipt policy for the recipient.

Also stored in RAM (168) is an operating system (154). Operating systems useful in network servers according to embodiments of the present invention include UNIX™, Linux™, Microsoft XP™, AIX™, IBM's i5/OS™, and others as will occur to those of skill in the art. Operating system (154), shared network application (106), and web server (232) in the example of FIG. 2 are shown in RAM (168), but many components of such software typically are stored in non-volatile memory (166) also.

Figure 2:
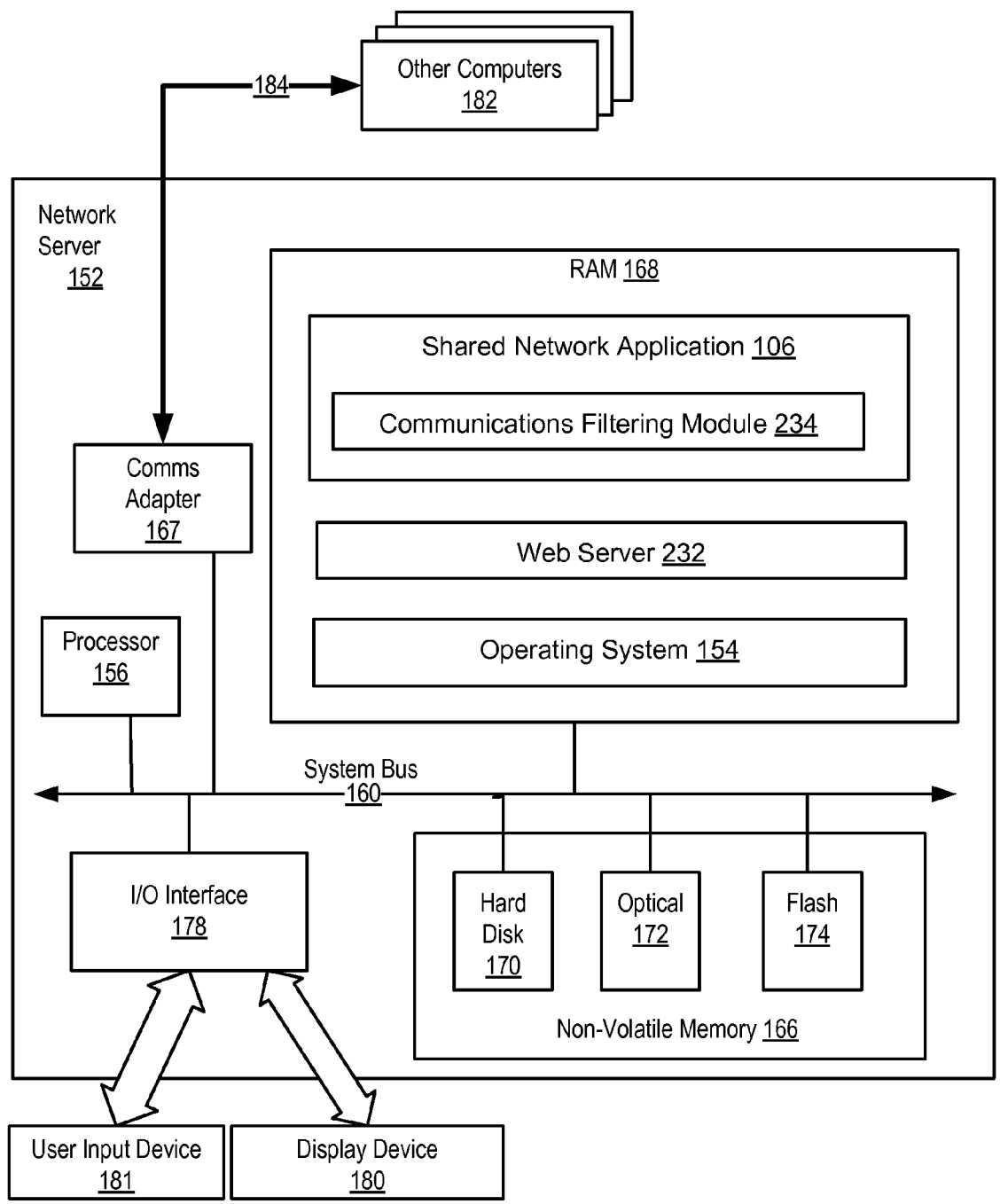
FIG. 2 sets forth a block diagram of automated computing machinery comprising an exemplary network server useful in filtering communications between users of a shared network according to embodiments of the present invention.

Network server (152) of FIG. 2 includes non-volatile computer memory (166) coupled through a system bus (160) to processor (156) and to other components of the network server (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example network server of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary network server (152) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for filtering communications between users of a shared network according to embodiments of the present invention include modems for wired dial-up communications, Ethernet (IEEE 802.3) adapters for wired network communications, and 802.11b adapters for wireless network communications.

Figure 3:
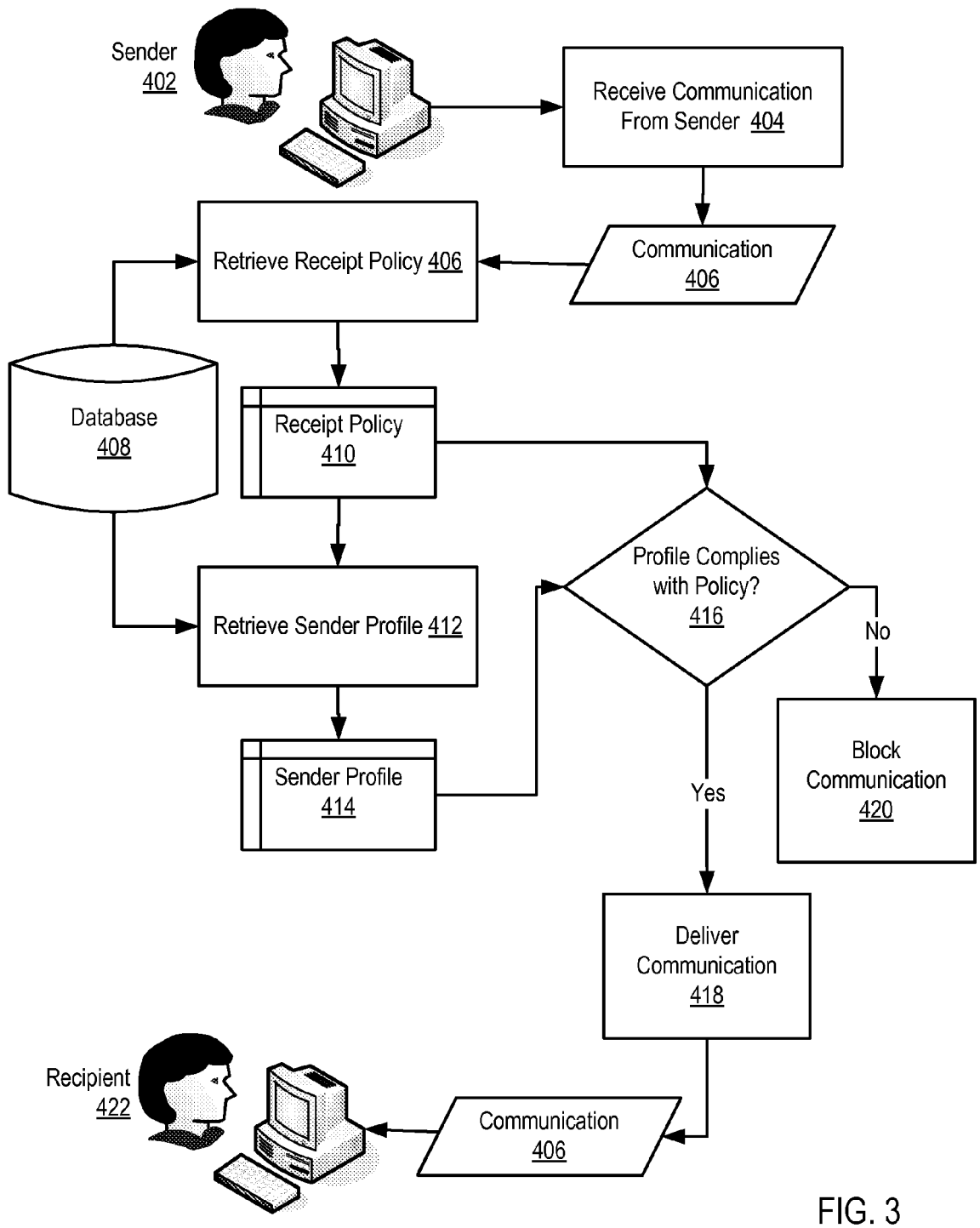
FIG. 3 sets forth a flow chart illustrating an exemplary method for filtering communications between users of a shared network according to embodiments of the present invention.

For further explanation, FIG. 3 sets forth a flow chart illustrating an exemplary method for filtering communications between users of a shared network according to embodiments of the present invention. As mentioned above, the term 'shared network' means a network whose communications are managed by a single provider and who maintains profile data on the users of those communications. One example of a shared network is a network supported by a social networking website such as MySpace.com. MySpace.com supports communications such as 'Friend Requests' which may be filtered according to embodiments of the present invention. Another example of a shared network in which communications maybe filtered according to embodiments of the present invention include instant messaging networks such as Yahoo Messenger, AOL Instant Messenger and others as will occur to those of skill in the art. Communications supported by such instant messaging networks which may be filtered according to embodiments of the present invention include invitations for inclusion in contacts lists, instant messages, private messages in supported by social networking sites, public comments supported by social networking sites, and others as will occur to those of skill in the art.

The method of FIG. 3 includes receiving (404) a communication (406) from a sender (402) for delivery to a recipient (422). As mentioned above, examples of communications according to the present invention include those managed by a single provider who maintains profile data on the users of those communications. Examples of such communications include friend requests supported by social networking websites, invitations for inclusion in contacts lists and instant messages in instant messaging networks, private messages in supported by social networking sites, public comments supported by social networking sites, and others as will occur to those of The method of FIG. 3 includes retrieving (406) a receipt policy (410) for the recipient (422). A receipt policy (410) is a set of criteria used to determine whether to receive communication for senders. The individual receipt policies may be customized for users and as such the individual criteria in receipt policies for different users may differ.

For further explanation, FIG. 4 sets forth a block diagram of a data structure (410) representing a receipt policy for user. The exemplary receipt policy (410) of FIG. 4 includes a User ID field (480) containing a unique identification of the recipient. The exemplary receipt policy of FIG. 4 includes an Acceptable Age Rage field (482) containing a range of sender ages from which the recipient is willing to receive communications. The exemplary receipt policy of FIG. 4 also includes a Picture Required field (484). The Picture Required field (484) is a Boolean indication as to whether a user is willing to receive communications from a sender whose profile contains no picture.

The exemplary receipt policy (410) of FIG. 4 includes a Blocked Communications Threshold (486). The Blocked Communications Threshold (486) contains a user set value that establishes a threshold number of previously blocked communications sent by the sender to any recipient. If the count of previously blocked communications sent by the sender exceeds the threshold value defined by the recipient, the communication will be blocked.

The exemplary receipt policy (410) of FIG. 4 includes a URLs Restricted field (488). The URLs Restricted field (488) includes a Boolean indication of whether the user is willing to receive communications from senders whose profiles or homepages include a URL to an external server. Such a field is useful in blocking communications from senders whose intention in the network is to drive users to an external web page for alternative purposes such as unwelcome sales.

The exemplary receipt policy (410) of FIG. 4 includes a Common Contacts Required field (490). The Common Contacts Required field (490) includes Boolean indication as to whether the user will only allow receipt of communications from senders who have at least one common contact in their contacts field of their profile. Similarly, the exemplary receipt policy of FIG. 4 includes a Common Friends Required field (492). The Common Friends Required (492) includes Boolean indication as to whether the user will only allow receipt of communications from senders who have at least one common friend in their friends field of their profile.

The exemplary receipt policy (410) of FIG. 4 includes an Acceptable Geographic Locations field (494). The Acceptable Geographic Locations field (494) includes a list of acceptable geographical locations associated with a sender's profile. That is, the Acceptable Geographic Locations field (494) includes one or more geographical locations that, if included in a sender's profile, may comply with the receipt policy. The exemplary receipt policy (410) of FIG. 4 includes a Whitelist of Exempt Users (496). A whitelist of exempt users is maintained as a list of users for whom the only criteria of the receipt policy is that those users are included in the whitelist. If a sender is included in the whitelist, the sender's profile will comply with the receipt policy.

The exemplary receipt policy (410) of FIG. 4 includes a Flash Restriction field (498). The Flash Restriction field includes a Boolean indication of whether the user is willing to receive communications from senders whose profiles or homepages include a flash graphics. Such a field is useful in blocking communications from senders whose intention in the network is to drive users to view graphics for alternative purposes such as unwelcome sales.

The exemplary receipt policy (410) of FIG. 4 includes a list of Restricted keywords (499). Such restricted keywords are keywords defining profiles and content of sender homepages that will not comply with the receipt policy. Such a list of keywords may usefully restrict inappropriate or unwanted communications.

Again with reference to FIG. 3: The method of FIG. 3 also includes retrieving (412) a profile (414) for the sender (402). A profile (414) for the sender (402) is a collection of information describing the sender typically maintained by the administrator of the shared network such as the hosting social network website or hosting instant messaging platform.

For further explanation, FIG. 5 sets forth a block diagram illustrating an exemplary data structure (414) representing a sender's profile. The exemplary sender's profile of FIG. 5 includes a User ID field (460). The User ID field (460) contains a unique identification of the sender. The exemplary sender's profile (414) of FIG. 5 also includes an Age field (462). The Age field (462) contains the age of the sender.

The exemplary sender's profile (414) of FIG. 5 also includes a Picture field (464). Picture field (464) contains a picture of the user, a reference to a picture of the user, or an indication as to whether such a picture is available. The exemplary sender's profile (414) of FIG. 5 also includes a Count of Blocked Communications field (466). The Count of Blocked Communications field (466) includes a count of the number of times a communication sent by the sender was blocked.

The exemplary sender's profile (414) of FIG. 5 also includes a URL field (468). The URL field (468) includes an indication as to whether the sender's profile or homepage includes a URL to an external server. The exemplary sender's profile (414) of FIG. 5 also includes a Contacts List field (470). The Contacts List field (470) contains the sender's contacts list. The exemplary sender's profile (414) of FIG. 5 also includes a Friends List field (472). The Friends List field (472) contains the sender's friends list.

The exemplary sender's profile (414) of FIG. 5 also includes a Geographic Location field (474). A Geographic Location field (474) includes a geographic location associated with the sender. Such a geographical location may include a location of the sender's residence, a location of the sender's workplace, or other locations as will occur to those of skill in the art.

The exemplary sender's profile (414) of FIG. 5 also includes a Status of Account field (476). A Status of Account field (476) includes an indication of the status of the sender's account such as active, suspended, closed, and so on as will occur to those of skill in the art.

Again with reference to FIG. 3: The method of FIG. 3 includes determining (416) whether the sender's profile (414) complies with the receipt policy (410) for the recipient (422). Determining (416) whether the sender's profile (414) complies with the receipt policy (410) for the recipient (422) may be carried out by comparing the criteria making up the receipt policy with the information describing a sender included in the sender's profile. In some cases, failing to meet a single criteria of the receipt polity may result in determining that the sender's profile (414) does not comply with the receipt policy (410) for the recipient (422). Alternatively, however, the criteria of the receipt policy may be weighted such that some criteria are more important that other criteria.

Examples of determining (416) whether the sender's profile (414) complies with the receipt policy (410) for the recipient (422) that may result in determining that the sender's profile does not comply with a receipt policy may include one or more of the following:

- determining that prohibited keywords are in the sender's profile or in the sender's homepage;
- determining that specific URLs are included in the sender's profile or included in the sender's homepage;
- determining that URLs including wildcards are included in the sender's profile or included in the sender's homepage;
- determining that the sender's profile does not share a single common contact with the contact list of the receipt profile;
- determining that the sender's profile does not share a single common friend with the friend list of the receipt policy;
- determining that the sender's profile or homepage contains certain embedded content such as external flash or external javascript methods;
- determining that the sender's profile has an associated geographic location outside those specified in the receipt policy;
- determining that the sender's profile identifies the sender's age as outside a designated age range of the receipt policy;
- determining that the sender's profile does not have an associated picture of the sender;
- determining that the count of blocked communications designated in the sender's profile exceeds a threshold established in the receipt policy;

and many others as will occur to those of skill in the art. The specific examples of determining (416) whether the sender's profile (414) complies with the receipt policy (410) for the recipient (422) are provided for explanation and not for limitation. In fact, additional and different criteria may be used to determine (416) whether the sender's profile (414) complies with the receipt policy (410) for the recipient (422) and all such criteria may be used in accordance with the present invention.

In some cases, a recipient may wish to maintain a whitelist of users that are exempt from all other requirements of the policy. That is, a whitelist is maintained as a list of users for whom the only criteria of the receipt policy is that those senders are included in the whitelist. If the sender is included in the whitelist in such cases, the sender's profile will comply with the receipt policy of the recipient owner of the whitelist and the communication will be delivered. In such cases, determining (416) whether the sender's profile (414) complies with the receipt policy (410) for the recipient (422) is carried out by comparing a sender ID with a whitelist in the policy and determining that the sender's profile complies with the receipt policy for the recipient if the sender ID is contained in the whitelist.

The method of FIG. 3 also includes delivering (418) the communication (406) to the recipient (422) if the sender's profile complies with the receipt policy for the recipient. Delivering (418) the communication (406) to the recipient (422) if the sender's profile complies with the receipt policy for the recipient may also include delivering with the communication a notification that the sender's profile of the delivered communication complied with the recipients' receipt policy.

The method of FIG. 3 also includes blocking (420) the communication if the sender's profile does not comply with the receipt policy for the recipient. Blocking (420) the communication if the sender's profile does not comply with the receipt policy for the recipient may be carried out by destroying the communication, returning the communication to the sender, or in other ways as will occur to those of skill in the art.

In some embodiments, blocking (420) the communication may include isolating the communication and notifying the user of the blocked communication. A user may then upon the user's own motion initiate receipt of the blocked communication, ignore the communication, or instruct that the communication be destroyed or returned.

Figure 6:
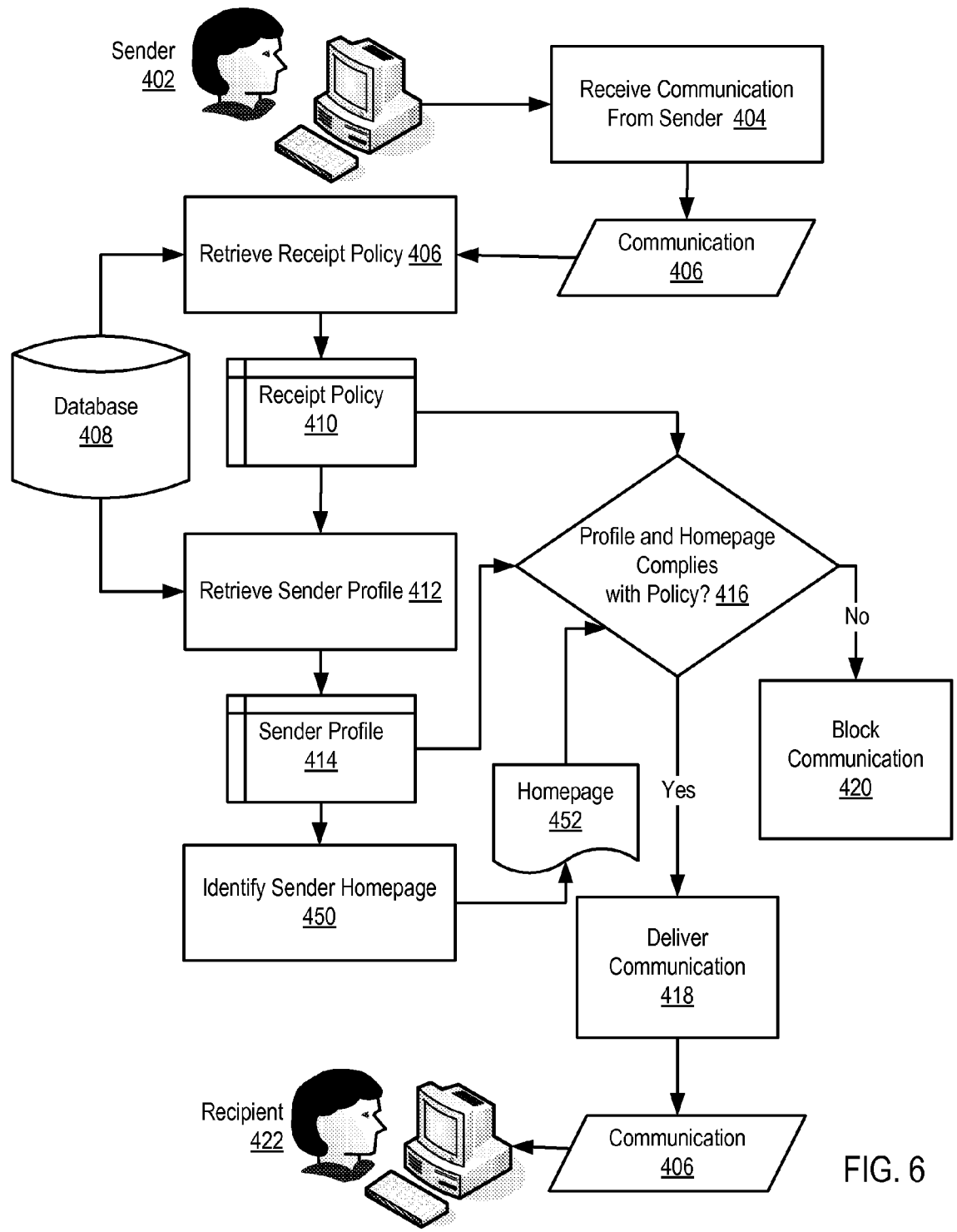
FIG. 6 sets forth a flow chart illustrating an additional exemplary method for filtering communications between users of a shared network.

For further explanation, FIG. 6 sets forth a flow chart illustrating an additional exemplary method for filtering communications between users of a shared network. The method of FIG. 6 is similar to the method of FIG. 3 in that the method of FIG. 6 includes receiving (404) a communication (406) from a sender (402) for delivery to a recipient (422); retrieving (406) a receipt policy (410) for the recipient (422); retrieving (412) a profile (414) for the sender (402); determining (416) whether the sender's profile (414) complies with the receipt policy (410) for the recipient (422); delivering (418) the communication (406) to the recipient (422) if the sender's profile complies with the receipt policy for the recipient; and blocking (420) the communication if the sender's profile does not comply with the receipt policy for the recipient.

The method of FIG. 6 differs from the method of FIG. 3 in that the method of FIG. 3 also includes identifying (450) a homepage (452) for the sender. In the method of FIG. 6 determining (416) whether the sender's profile (414) complies with the receipt policy (410) for the recipient includes determining whether the content of the sender's homepage (450) complies with the receipt policy (410) for the recipient; delivering (418) the communication (406) to the recipient (422) if the sender's profile complies with the receipt policy for the recipient includes delivering the communication to the recipient if the content of the sender's homepage complies with the receipt policy for the recipient further comprises; and blocking (420) the communication if the sender's profile (414) complies with the receipt policy (410) for the recipient also includes blocking the communication if the content of the sender's homepage (452) does not comply with the receipt policy (410) for the recipient (422).

Turning more specifically to the additional steps of the method of FIG. 6, the method of Figure includes identifying (450) a homepage (452) for the sender. Many social networking web sites for example provide a homepage for the user. Identifying (450) a homepage (452) for the sender may therefore be carried out by identifying a URL to the homepage of the sender contained for example in the sender's profile and retrieving the homepage.

In the method of FIG. 6, determining (416) whether the sender's profile (414) complies with the receipt policy (410) for the recipient includes determining whether the content of the sender's homepage (450) complies with the receipt policy (410) for the recipient. The content of the homepage may include text, images, specific URLs, URLs identified with wildcards, and other content included in the homepage. Some such content may be objectionable and prohibited by the receipt policy. Determining (416) whether the sender's profile (414) complies with the receipt policy (410) for the recipient includes determining whether the content of the sender's homepage (450) complies with the receipt policy (410) for the recipient may therefore be carried out by scanning the homepage for restricted keywords, URLs, images, or other content identified in the receipt policy.

In the method of FIG. 6, delivering (418) the communication (406) to the recipient (422) if the sender's profile complies with the receipt policy for the recipient includes delivering the communication to the recipient if the content of the sender's homepage complies with the receipt policy for the recipient. Delivering the communication to the recipient if the content of the sender's homepage complies with the receipt policy for the recipient may also include delivering with the communication a notification that the sender's profile of the delivered communication complied with the recipients' receipt policy.

In the method of FIG. 6, blocking (420) the communication if the sender's profile (414) complies with the receipt policy (410) for the recipient includes blocking the communication if the content of the sender's homepage (452) does not comply with the receipt policy (410) for the recipient (422). Blocking the communication if the content of the sender's homepage (452) does not comply with the receipt policy (410) for the recipient (422) may be carried out by destroying the communication, returning the communication to the sender, or in other ways as will occur to those of skill in the art.

In some embodiments, blocking the communication may include isolating the communication and notifying the user of the blocked communication. A user may then upon the user's own motion initiate receipt of the blocked communication, ignore the communication, or instruct that the communication be destroyed or returned.

Figure 7:
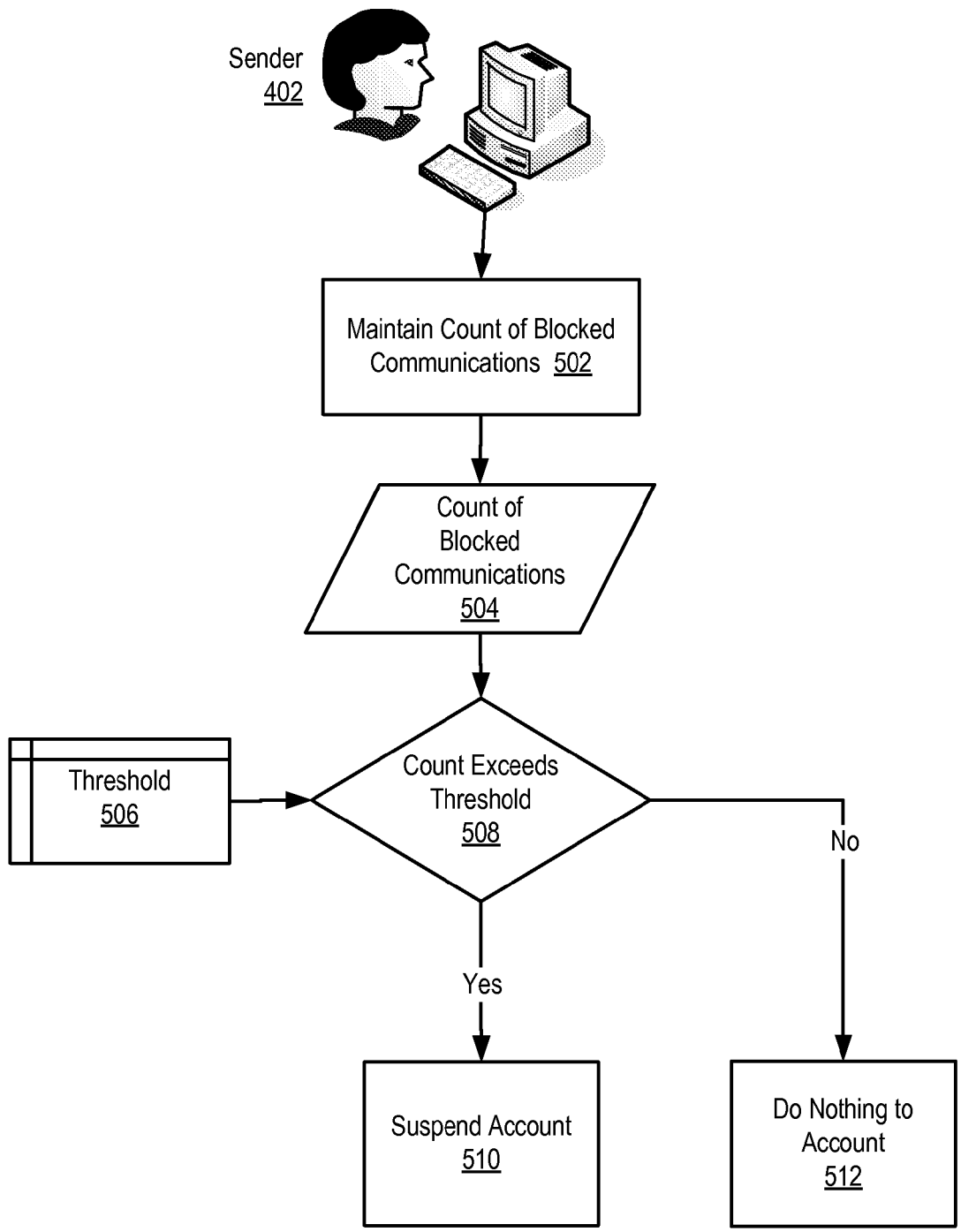
FIG. 7 sets forth a flow chart illustrating additional aspects of filtering communications between users of a shared network according to some embodiments of the present invention.

For further explanation, FIG. 7 sets forth a flow chart illustrating additional aspects of filtering communications between users of a shared network according to some embodiments of the present invention. The method of FIG. 7 includes maintaining (502) a count (504) of the number of blocked communications sent by the sender (402). Maintaining (502) a count (504) of the number of blocked communications sent by the sender (402) may be carried out by incrementing a counter maintained in the sender's profile each time a communication sent by the sender is blocked. The method of FIG. 7 includes determining (508) whether the count (504) exceeds a threshold (506). The determined threshold may be an administrator determined threshold designed to identify malicious users of the shared network.

The method of FIG. 7 includes doing nothing to the sender's account if the count (504) does not exceed the threshold (506) and suspending (510) an account for the sender (402) if the count (504) exceeds the threshold (506). Suspending (510) an account for the sender (402) if the count (504) exceeds the threshold (506) may be carried out by disabling access to the account and notifying the sender, disabling the account permanently, disabling the account temporarily, or in other ways as will occur to those of skill in the art.

Figure 8:
FIG. 8 sets forth a block diagram of a friend request manager page of a social networking website called 'Some Social Networking Site.'

For further explanation, FIG. 8 sets forth a block diagram of a friend request manager page (522) of a social networking website called 'Some Social Networking Site.' The example friend request manager page (522) has a display box (532) providing menu options for various functions of the social networking web site.

The example friend request manager page (522) also has displayed a friend request (528) which is a communication filtered according to embodiments of the present invention. The friend request was received from a sender, in this case Will Pagán, a receipt policy was retrieved for the recipient of the friend request, and a profile was retrieved for Will Pagán. The profile of Will Pagán complied with the receipt policy of the recipient; and the friend request was delivered with the following notification, "Will Pagán wants to be your friend and his profile complies with your receipt policy." As such, the recipient of the friend request is advantageously advised that the friend request was filtered in accordance with the present invention.

The example friend request manager page (522) also has a graphical user interface button (530) for viewing friend requests that are blocked in accordance with the present invention. Such blocked friend requests may be vied by invoking the GUI button to retrieve a page displaying the blocked friend requests.

Filtering communications between users of a shared network includes creating for a user a receipt policy. For further explanation, FIG. 9 sets forth a block diagram of a receipt policy manager (900) page of a social networking website called 'Some Social Networking Site.' The receipt policy manager (900) page is designed for creating for a user a receipt policy including receiving from a user identifications of receipt criteria for inclusion in the receipt policy.

Figure 9:
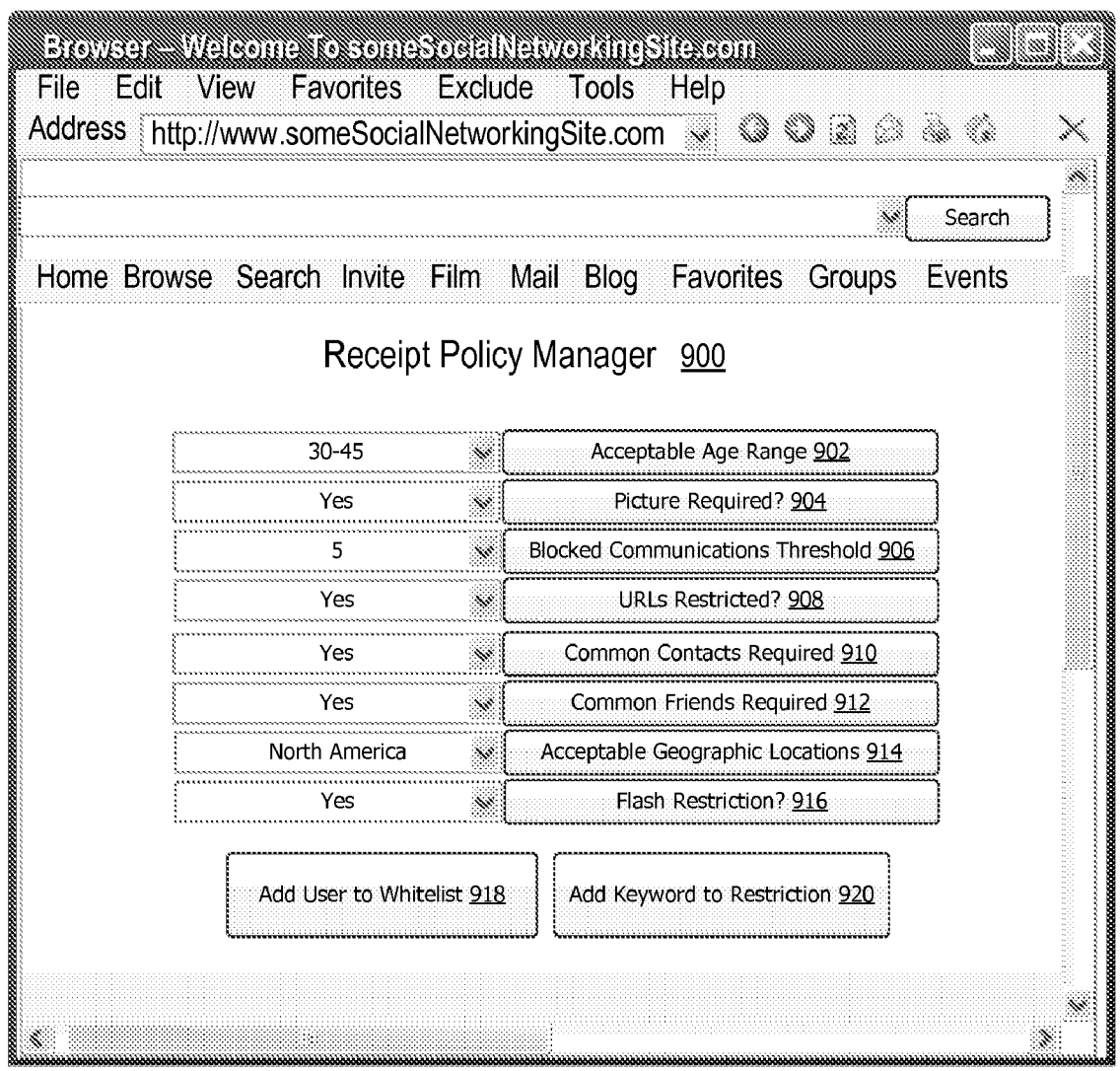
FIG. 9 sets forth a block diagram of a receipt policy manager page of a social networking website called 'Some Social Networking Site.'

The receipt policy manager (900) page includes a pull down menu and button (902) for receiving from a user an acceptable age range for filtering receipt of communications from senders outside that acceptable range. The selected acceptable age range in the example of FIG. 9 is '30-45.'

The receipt policy manager (900) page includes a pull down menu and button (904) for receiving from a user an indication as to whether a picture is required in the senders profile for filtering communications according to the present invention. The selected picture requirement in the example of FIG. 9 is 'yes.'

The receipt policy manager (900) page includes a pull down menu and button (906) for receiving from a user a value establishing a threshold for the number of blocked communications sent from a sender to any recipient beyond which the policy determines that communication should be blocked. The selected threshold value in the example of FIG. 9 is '5.'

The receipt policy manager (900) page includes a pull down menu and button (908) for receiving from a user an indication as to whether URLs in the senders profile or homepage are restricted. The selected URL restriction in the example of FIG. 9 is 'yes.'

The receipt policy manager (900) page includes a pull down menu and button (910) for receiving from a user an indication as to whether common contacts between the sender and the recipient are required for receiving communications from a sender. The selected picture requirement in the example of FIG. 9 is 'yes.'

The receipt policy manager (900) page includes a pull down menu and button (912) for receiving from a user an indication as to whether common friends between the sender and the recipient are required for receiving communications from a sender. The selected picture requirement in the example of FIG. 9 is 'yes.'

The receipt policy manager (900) page includes a pull down menu and button (914) for receiving from a user an acceptable selection of geographic locations for filtering receipt of communications from senders outside that acceptable selection of geographic locations. The selected acceptable age range in the example of FIG. 9 is 'North America.'

The receipt policy manager (900) page includes a pull down menu and button (916) for receiving from a user an indication as to whether flash graphics in the senders profile or homepage are restricted. The selected flash restriction in the example of FIG. 9 is 'yes.'

The receipt policy manager (900) page includes a button (918) for adding users to a whitelist of users who automatically satisfy the receipt policy by being included in the whitelist and a button (920) for adding restricted keywords to the receipt policy for filtering communications in accordance wit the present invention.

Creating for a user a receipt policy according to the example of FIG. 9 includes user selected criteria. In some embodiments, however, creating for a user a receipt policy may also include including required administrative receipt criteria for inclusion in the receipt policy. Required administrative receipt criteria may include for example blacklists of known malicious users, thresholds for blocked communications designed to identify malicious users, and others as will occur to those of skill in the art. The primary distinction between required administrative receipt criteria and receipt criteria received from a user is that the required administrative receipt criteria is imposed by the administrators of the shared network. As such, required administrative receipt criteria provides a baseline of filtering criteria for filtering communications between users of a shared network according to the present invention.

The examples described above, primarily describe shared networks as those supported by a social networking websites and communication as friend requests. This is for explanation, and not for limitation. In fact many different types of shared networks exists and all such shared networks are well within the scope of the present invention such as instant messaging networks having communications such as invitations for inclusion in contacts lists and instant messages.

Exemplary embodiments of the present invention are described largely in the context of a fully functional computer system for filtering communications between users of a shared network. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for filtering communications between users of a shared network, the method comprising:
   receiving by a shared network application running on a network server a communication from a sender for delivery to a recipient within the shared network;
   retrieving by a communications filtering module from a database of the network server a receipt policy for the recipient; wherein the receipt policy is a set of criteria defined by the recipient to set forth conditions for accepting the communication from the sender;
   retrieving by the communications filtering module from the database sender's profile for the sender; wherein the sender's profile includes sender's personal information and a link to a homepage of the sender, the sender profile is set by the sender and is maintained by the shared network;
   identifying from the sender's profile the homepage for the sender using the link in the sender's profile, wherein the homepage is provided to the sender and is managed by the network server;
   determining by the communications filtering module whether the sender's profile complies with the receipt policy for the recipient and determining whether content of the sender's homepage complies with the receipt policy for the recipient;
   delivering the communication by the shared network application to the recipient in response to the sender's profile and the content of the sender's homepage comply with the receipt policy for the recipient;
   blocking the communication by the shared network application in response to the sender's profile and the content of the sender's homepage do not comply with the receipt policy for the recipient, and
   maintaining by the shared network application a count of the number of blocked communications sent by the sender;
   determining whether the count exceeds a threshold; and
   suspending the sender's account in response to the count exceeds the threshold.

2. The method of claim 1 wherein determining whether the sender's profile complies with the receipt policy for the recipient further comprises comparing a sender ID with a whitelist in the policy; and
   determining that the sender's profile complies with the receipt policy for the recipient if the sender ID is contained in the whitelist.

3. The method of claim 1 further comprising creating for a user a receipt policy including receiving from a user identifications of receipt criteria for inclusion in the receipt policy.

4. The method of claim 3 wherein said creating for a user a receipt policy further comprises including required administrative receipt criteria for inclusion in the receipt policy.

5. The method of claim 1 wherein the shared network further comprises a network supported by a social networking website and the communication further comprises a friend request.

6. The method of claim 1 wherein the shared network includes an instant messaging network and the communication further comprises an invitation for inclusion in a contacts list.

7. The method of claim 1 wherein the shared network includes an instant messaging network and the communication further comprises an instant message.

8. The method of claim 1 wherein the shared network includes a network supported by a social networking website and the communication further comprises an private message.

9. The method of claim 1 wherein the shared network includes a network supported by a social networking website and the communication further comprises a public comment.

10. A system for filtering communications between users of a shared network, the system comprising:
    a computer processor; and
    a computer memory operatively coupled to the computer processor, the computer memory stores computer program instructions that, when executed by the computer processor, cause the computer processor to perform the steps of:

receiving by a shared network application running on a network server a communication from a sender for delivery to a recipient within the shared network;

retrieving by a communications filtering module from a database of the network server a receipt policy for the recipient; wherein the receipt policy is a set of criteria defined by the recipient to set forth conditions for accepting the communication from the sender;

retrieving by the communications filtering module from the database sender's profile for the sender; wherein the sender's profile includes sender's personal information and a link to a homepage of the sender, the sender profile is set by the sender and is maintained by the shared network;

identifying from the sender's profile the homepage for the sender using the link in the sender's profile, wherein the homepage is provided to the sender and is managed by the network server;

determining by the communications filtering module whether the sender's profile complies with the receipt policy for the recipient and determining whether content of the sender's homepage complies with the receipt policy for the recipient;

delivering the communication by the shared network application to the recipient in response to the sender's profile and the content of the sender's homepage comply with the receipt policy for the recipient;

blocking the communication by the shared network application in response to the sender's profile and the content of the sender's homepage do not comply with the receipt policy for the recipient, and maintaining by the shared network application a count of the number of blocked communications sent by the sender;

determining whether the count exceeds a threshold; and suspending the sender's account in response to the count exceeds the threshold.

11. The system of claim 10 wherein the computer program instructions for determining whether the sender's profile complies with the receipt policy for the recipient further comprise computer program instructions for:

comparing a sender ID with a whitelist in the policy; and determining that the sender's profile complies with the receipt policy for the recipient if the sender ID is contained in the whitelist.

12. The system of claim 10 wherein the computer program instructions further comprise computer program instructions for creating for a user a receipt policy including receiving from a user identifications of receipt criteria for inclusion in the receipt policy.

13. The system of claim 12 wherein the computer program instructions for creating for a user a receipt policy further comprise computer program instructions for including required administrative receipt criteria for inclusion in the receipt policy.

14. The system of claim 10 wherein the shared network further comprises a network supported by a social networking website and the communication further comprises a friend request.

15. The system of claim 10 wherein the shared network includes an instant messaging network and the communication further comprises an invitation for inclusion in a contacts list.

16. The system of claim 10 wherein the shared network includes an instant messaging network and the communication further comprises an instant message.

17. The system of claim 10 wherein the shared network includes a network supported by a social networking website and the communication further comprises an private message.

18. The system of claim 10 wherein the shared network includes a network supported by a social networking website and the communication further comprises a public comment.

19. A computer program product stored on a non-transitory computer readable medium for filtering communications between users of a shared network, the computer program product comprising computer program instructions that, when executed by the computer processor, cause the computer processor to perform the steps of:

receiving by a shared network application running on a network server a communication from a sender for delivery to a recipient within the shared network;

retrieving by a communications filtering module from a database of the network server a receipt policy for the recipient; wherein the receipt policy is a set of criteria defined by the recipient to set forth conditions for accepting the communication from the sender;

retrieving by the communications filtering module from the database sender's profile for the sender; wherein the sender's profile includes sender's personal information and a link to a homepage of the sender, the sender profile is set by the sender and is maintained by the shared network;

identifying from the sender's profile the homepage for the sender using the link within the sender's profile, wherein the homepage is provided to the sender and is managed by the network server;

determining by the communications filtering module whether the sender's profile complies with the receipt policy for the recipient and determining whether content of the sender's homepage complies with the receipt policy for the recipient;

delivering the communication by the shared network application to the recipient in response to the sender's profile and the content of the sender's homepage comply with the receipt policy for the recipient;

blocking the communication by the shared network application in response to the sender's profile and the content of the sender's homepage do not comply with the receipt policy for the recipient, and maintaining by the shared network application a count of the number of blocked communications sent by the sender;

determining whether the count exceeds a threshold; and suspending the sender's account in response to the count exceeds the threshold.

20. The computer program product of claim 19 wherein computer program instructions for determining whether the sender's profile complies with the receipt policy for the recipient further comprises computer program instructions for:

comparing a sender ID with a whitelist in the policy; and determining that the sender's profile complies with the receipt policy for the recipient if the sender ID is contained in the whitelist.

21. The computer program product of claim 19 further comprising computer program instructions for creating for a user a receipt policy including receiving from a user identifications of receipt criteria for inclusion in the receipt policy.

22. The computer program product of claim 21 wherein the computer program instructions for creating for a user a receipt policy further comprise computer program instructions for including required administrative receipt criteria for inclusion in the receipt policy.

23. The computer program product of claim 19 wherein the shared network further comprises a network supported by a social networking website and the communication further comprises a friend request.

24. The computer program product of claim 19 wherein the shared network includes an instant messaging network and the communication further comprises an invitation for inclusion in a contacts list.

25. The computer program product of claim 19 wherein the shared network includes an instant messaging network and the communication further comprises an instant message.

26. The computer program product of claim 19 wherein the shared network includes a network supported by a social networking website and the communication further comprises an private message.

27. The computer program product of claim 19 wherein the shared network includes a network supported by a social networking website and the communication further comprises a public comment.

* * * * *